US010780874B2

(12) United States Patent
Hester et al.

(10) Patent No.: US 10,780,874 B2
(45) Date of Patent: Sep. 22, 2020

(54) SUSPENSION ASSEMBLY WITH DISC BRAKE ACTUATOR PROTECTION

(71) Applicant: Hendrickson USA, L.L.C., Itasca, IL (US)

(72) Inventors: Donald R. Hester, East Canton, OH (US); Benedetto A. Naples, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 114 days.

(21) Appl. No.: 16/101,661

(22) Filed: Aug. 13, 2018

(65) Prior Publication Data

US 2019/0047536 A1 Feb. 14, 2019

Related U.S. Application Data

(60) Provisional application No. 62/544,944, filed on Aug. 14, 2017.

(51) Int. Cl.

| | |
|---|---|
| *B60G 3/12* | (2006.01) |
| *B60T 17/08* | (2006.01) |
| *B60T 13/36* | (2006.01) |
| *B60T 1/06* | (2006.01) |
| *B60G 7/00* | (2006.01) |
| *B60G 9/02* | (2006.01) |
| *B60G 9/00* | (2006.01) |

(52) U.S. Cl.
CPC ............ *B60T 17/088* (2013.01); *B60G 7/001* (2013.01); *B60G 9/003* (2013.01); *B60G 9/02* (2013.01); *B60T 1/065* (2013.01); *B60T 13/36* (2013.01); *B60G 2200/31* (2013.01); *B60G 2200/32* (2013.01); *B60G 2206/012* (2013.01); *B60G 2206/10* (2013.01); *B60G 2206/11* (2013.01); *B60G 2300/026* (2013.01)

(58) Field of Classification Search
CPC ........ B60T 17/088; B60T 1/065; B60T 13/36; B60G 7/001; B60G 2300/026; B60G 2206/50; B60G 2206/10; B60G 2206/012; B60G 2200/32

See application file for complete search history.

(56) References Cited

U.S. PATENT DOCUMENTS

| | | |
|---|---|---|
| 4,165,098 A | 8/1979 | Magner |
| 5,039,336 A | 8/1991 | Feuling |
| 5,203,585 A | 4/1993 | Ierce |
| 5,639,110 A | 6/1997 | Pierce et al. |

(Continued)

FOREIGN PATENT DOCUMENTS

| | | |
|---|---|---|
| DE | 10055859 A1 | 5/2002 |
| EP | 0243191 B1 | 11/1990 |

(Continued)

*Primary Examiner* — Toan C To
(74) *Attorney, Agent, or Firm* — Dureska & Moore, LLC; David P. Dureska; Brent L. Moore

(57) ABSTRACT

A suspension assembly for a heavy-duty vehicle axle/suspension system that includes a geometry that enables components of a brake system to be mounted above and be protected by a beam of the suspension assembly. In an embodiment of the suspension assembly, the beam includes a recessed area that allows a brake actuator to be positioned at least partially within or disposed adjacent the recessed area.

17 Claims, 8 Drawing Sheets

(56) References Cited

U.S. PATENT DOCUMENTS

| | | |
|---|---|---|
| 7,669,866 B2 | 3/2010 | Peaker et al. |
| 9,605,724 B2 * | 3/2017 | Okuma ................... F16D 66/00 |
| 9,890,825 B2 * | 2/2018 | White ................. F16D 65/0081 |
| 10,017,021 B2 * | 7/2018 | Saieg .................... B60B 35/004 |
| 2004/0084255 A1 * | 5/2004 | Fisher ................... B60T 17/081 |
| | | 188/71.1 |
| 2005/0082783 A1 * | 4/2005 | Ramsey ................. B60G 7/001 |
| | | 280/124.128 |
| 2005/0110233 A1 | 5/2005 | Hedenberg |
| 2006/0163834 A1 | 7/2006 | Brereton et al. |
| 2008/0047787 A1 * | 2/2008 | Scheckelhoff .......... F16D 65/18 |
| | | 188/72.9 |
| 2011/0089660 A1 | 4/2011 | Dodd et al. |
| 2014/0327220 A1 | 11/2014 | Holt et al. |
| 2017/0259800 A1 | 9/2017 | Fulton et al. |

FOREIGN PATENT DOCUMENTS

| | | |
|---|---|---|
| EP | 1270283 A2 | 1/2003 |
| EP | 2030815 A1 | 3/2009 |
| EP | 1572476 B1 | 4/2009 |
| KR | 100649270 B1 | 11/2006 |
| WO | 1998009094 A1 | 3/1998 |
| WO | 2002020288 A1 | 3/2002 |

* cited by examiner

SUSPENSION ASSEMBLY WITH DISC BRAKE ACTUATOR PROTECTION

CROSS-REFERENCE TO RELATED APPLICATION

This application claims the benefit of U.S. Provisional Patent Application Ser. No. 62/544,944, filed Aug. 14, 2017.

BACKGROUND

Technical Field

The subject matter of this application relates generally to suspension assemblies for axle/suspension systems of heavy-duty vehicles, such as trucks and tractor-trailers. More particularly, the subject matter of this application relates to disc air brake systems incorporated into suspension assemblies for heavy-duty vehicle axle/suspension systems. More specifically, the subject matter relates to a suspension assembly for a heavy-duty vehicle axle/suspension system that enables a disc brake actuator to be positioned at least partially within a recessed area formed in the beam of the suspension assembly, which provides increased protection to the brake actuator during operation of the vehicle, improves the integrity of the interface between the brake actuator and the caliper, and provides an improved, more protected pneumatic supply line configuration, while maintaining critical clearances between certain components of the suspension assembly and the brake system, maintaining a precise position of the brake actuator radially from the centerline of the axle, and maintaining proper reaction of critical in-service loads by the beam of the suspension assembly during operation of the vehicle. The suspension assembly of the disclosed subject matter also allows the brake actuator to be mounted in line with and/or near the caliper to reduce the number and/or length of components needed for the brake actuator to activate the disc brakes.

BACKGROUND ART

The use of air-ride trailing and leading arm rigid beam-type axle/suspension systems has been very popular in the heavy-duty truck and tractor-trailer industry for many years. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, secondary slider frame, or bogie. For the purpose of convenience and clarity, reference herein will be made to main members, with the understanding that such reference is by way of example, and that the disclosed subject matter applies to heavy-duty vehicle axle/suspension systems suspended from main members of: primary frames, movable subframes and non-movable subframes.

Each suspension assembly of an axle/suspension system generally includes a longitudinally extending elongated beam. Each beam typically is located adjacent to and below a respective one of a pair of spaced-apart longitudinally extending main members and one or more cross members which form the frame of the slider or vehicle. More specifically, each beam is pivotally connected at one of its ends to a hanger which in turn is attached to and depends from a respective one of the main members of the vehicle. An axle extends transversely between and typically is connected to or captured by the beams of the pair of suspension assemblies at a selected location from about the mid-point of each beam to the end of the beam opposite from its pivotal connection to the hanger. The beam opposite its pivotal connection to the hanger typically is connected to a force reacting suspension component, such as an air spring, or its equivalent, which in turn is connected to a respective one of the main members. A brake system and/or one or more shock absorbers for providing damping to the axle/suspension system of the vehicle may also be mounted on the axle/suspension system. The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of the vehicle.

The axle/suspension systems of the heavy-duty vehicle act to cushion the ride, dampen vibrations and stabilize the vehicle. More particularly, as the vehicle is traveling over the road, its wheels encounter road conditions that impart various forces, loads, and/or stresses, collectively referred to herein as forces, to the respective axle on which the wheels are mounted, and in turn, to the suspension assemblies that are connected to and support the axle. In order to minimize the detrimental effect of these forces on the vehicle as it is operating, the axle/suspension system is designed to react and/or absorb at least some of them.

These forces include vertical forces caused by vertical movement of the wheels as they encounter certain road conditions, fore-aft forces caused by acceleration and deceleration of the vehicle, and lateral and torsional forces associated with transverse vehicle movement, such as turning of the vehicle and lane-change maneuvers. In order to address such disparate forces, axle/suspension systems have differing structural requirements. More particularly, it is desirable for an axle/suspension system to be fairly stiff in order to minimize the amount of sway experienced by the vehicle and thus provide what is known in the art as roll stability. However, it is also desirable for an axle/suspension system to be relatively flexible to assist in cushioning the vehicle from vertical impacts, and to provide compliance so that the components of the axle/suspension system resist failure, thereby increasing durability of the axle/suspension system.

Disc air brake systems are often used on heavy-duty vehicle axle/suspension systems. Disc air brake systems operate by forcing a pair of opposing brake pads against a rotor to create friction between the pads and the rotor to slow and/or stop the vehicle. More particularly, disc air brake systems typically include two or more disc brake assemblies, with each disc brake assembly being operatively mounted on or adjacent a wheel end of the heavy-duty vehicle.

Typically, each disc brake assembly includes a carrier. The carrier is attached to a torque plate, typically by mechanical fasteners, such as bolts. The torque plate in turn is rigidly connected to an axle of the axle/suspension system, such as by welding. The torque plate is located on or adjacent a wheel end of the heavy-duty vehicle. A caliper is slidably connected to the carrier via a pair of guide pins attached to the carrier in a known manner. The torque plate resists torque that is generated during braking and maintains proper alignment of the carrier and caliper to ensure proper operation of the components of the disc brake assembly.

The caliper is formed with a bore for receiving one or more pistons, and is also formed with plurality of openings for receiving a brake actuator. The brake actuator typically is an air chamber, referred to as a brake chamber in the art. The brake actuator is in fluid communication with a compressed air source via a pneumatic supply line and activates movement of the piston(s) through a sealed mechanical actuation mechanism. The sealed mechanical actuation mechanism amplifies the force between the brake actuator and the pistons. The caliper also includes an outboard pad seat that is disposed opposite the piston(s). A pair of brake pads are seated in the carrier, with one of the brake pads being adjacent the piston(s) and the other brake pad being adjacent the outboard pad seat. Each one of a pair of brake pads includes friction material that is mounted on a backing plate. Upon actuation by the brake actuator, the piston(s) and the outboard pad seat cooperate to control movement of the brake pads.

The rotor includes a disc portion, which is disposed between the pair of brake pads in a manner that allows the friction material of each pad to face a respective one of an inboard and an outboard surface of the disc portion. The rotor also includes a mounting portion that enables the rotor to be mounted to a wheel hub of a respective wheel end assembly with mechanical fasteners, such as bolts. A sleeve is integrally formed with and extends between the disc portion of the rotor and the mounting portion of the rotor. The wheel hub is rotatably mounted on the vehicle axle in a known manner. One or more tire rims and tires in turn are mounted on the wheel hub. Because the rotor is mechanically attached to the wheel hub, as the tire rotates during vehicle operation, the rotor also rotates about the vehicle axle.

During vehicle travel, when the vehicle brake system is engaged, compressed air flows to the brake actuator via the pneumatic supply line. Actuation of the brake actuator causes outboard movement of the caliper piston(s), which in turn forces the brake pad adjacent the piston outboardly. As the brake pad is forced against the inboard surface of the rotor, because the caliper slidably engages the carrier via the guide pins, the caliper is forced inboardly, which in turn forces the brake pad adjacent the outboard pad seat against the outboard surface of the rotor. Together, contact of the brake pads against the inboard and outboard surfaces of the rotor disc portion slows and/or stops rotation of the wheel hub, and thus the vehicle wheel.

Most prior art suspension assembly configurations include brake actuators mounted to the caliper such that they extend inboardly from the caliper. Because of this orientation and the space constraints in a brake system and a corresponding axle/suspension system, the prior art brake actuator and caliper typically must be positioned behind and/or beneath the beam and/or axle of the axle/suspension system. This location potentially creates an undesirable level of clearance between the brake actuator and caliper and the ground, which can potentially result in the brake actuator and/or caliper being damaged by hitting the ground or being struck with road debris kicked up from the road below during vehicle operation.

Moreover, the location of the brake actuator and caliper behind and/or beneath the beam and/or axle of the axle/suspension system may potentially cause the interface between the actuator and the caliper to be subjected to high accelerations from road input forces, which can in turn lead to increased stress at the interface of the actuator to the caliper, while potentially also increasing the opportunity for contamination of the brake actuator and/or caliper from the harsh road environment.

In addition, the location of the brake actuator and caliper behind and/or beneath the beam and/or axle of the axle/suspension system causes the pneumatic supply lines of the brake assembly to be positioned relatively close to the ground, where they can potentially be exposed to road debris and road hazards that could potentially cause damage to the pneumatic supply lines.

The disadvantages and drawbacks associated with prior art suspension assemblies make it desirable to develop an improved suspension assembly that accommodates mounting of brake actuators on a heavy-duty vehicle in a more desirable and protected location. More specifically, there is a need for a suspension assembly for heavy-duty vehicles that allows a brake actuator of a disc air brake system to be mounted in a manner that provides improved protection to the brake actuator, improved integrity of the interface of the brake actuator to the caliper, improved, more protected pneumatic supply line configuration, while maintaining critical clearances between certain components of the suspension assembly and the brake system, maintaining a precise position of the brake actuator radially from the centerline of the axle, and maintaining proper reaction of critical in-service loads by the beam of the suspension assembly during operation of the vehicle. The suspension assembly with disc brake actuator protection of the subject disclosure satisfies these needs.

BRIEF SUMMARY OF THE DISCLOSED SUBJECT MATTER

An objective of the disclosed subject matter is to provide a suspension assembly for a heavy-duty vehicle axle/suspension system that provides increased protection to a brake actuator of a disc air brake system during operation of the vehicle.

Another objective of the disclosed subject matter is to provide a suspension assembly for a heavy-duty vehicle axle/suspension system that provides improved integrity of the interface between the brake actuator and the caliper.

Yet another objective of the disclosed subject matter is to provide a suspension assembly for a heavy-duty vehicle axle/suspension system that provides an improved, more protected pneumatic supply line configuration.

Another objective of the disclosed subject matter is to provide a suspension assembly for a heavy-duty vehicle axle/suspension system that maintains critical clearances between components of the suspension assembly and the disc air brake system.

Yet another objective of the disclosed subject matter is to provide a suspension assembly for a heavy-duty vehicle axle/suspension system that maintains a precise position of the brake actuator radially from the centerline of the axle.

Another objective of the disclosed subject matter is to provide a suspension assembly for a heavy-duty vehicle axle/suspension system that maintains proper reaction of critical in-service loads by the beam of the suspension assembly during operation of the vehicle.

These objectives and others are achieved by the suspension assembly for a heavy-duty vehicle axle/suspension system of the disclosed subject matter, which includes: a beam, the beam being pivotally connected to a frame of the heavy duty vehicle adjacent a first end of the beam, an axle of the heavy-duty vehicle being rigidly attached to the beam; a force reacting suspension component mounted adjacent a second end of the beam, the force reacting suspension component also being connected to the frame; and a recessed area formed on a surface of the beam, the recessed area enabling a brake system component to be positioned above at least a portion of the beam adjacent the recessed area, the recessed area protecting the brake system component from road debris and contaminants.

BRIEF DESCRIPTION OF THE SEVERAL VIEWS OF THE DRAWINGS

The following description and drawings set forth certain illustrative aspects and implementations of the disclosed subject matter. These are indicative of but a few of the various ways in which one or more aspects or implementations or concepts of the disclosed subject matter may be employed. Further features and advantages of the disclosed subject matter will become apparent to those skilled in the art from reading the following description with reference to the accompanying drawings, in which.

Similar numbers and characters refer to similar parts throughout the drawings.

DETAILED DESCRIPTION OF THE DISCLOSED SUBJECT MATTER

Figure 1:
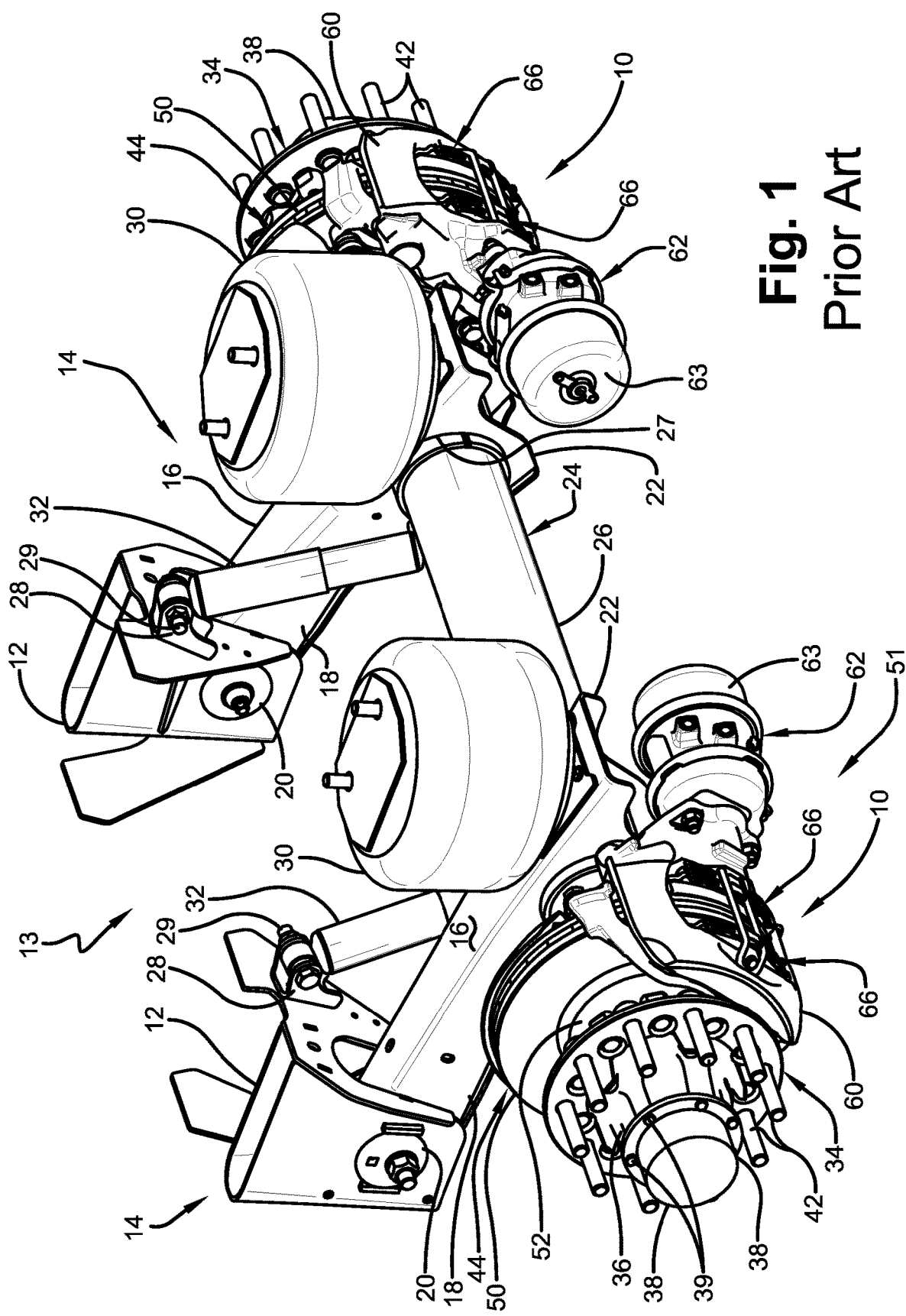
FIG. 1 is a top rear driver side perspective view of an axle/suspension system incorporating a pair of prior art suspension assemblies, showing a pair of brake actuators and calipers of a disc air brake system mounted below and behind their respective beams and the axle of the axle/suspension system.

In order to better understand the exemplary embodiment suspension assembly with disc brake actuator protection of the disclosed subject matter and the environment in which it operates, a trailing arm beam-type axle/suspension system that incorporates a pair of prior art suspension assemblies and a disc air brake system for heavy-duty vehicles is shown in FIG. 1, and is indicated generally at 13. Reference shall be made generally to a heavy-duty vehicle for the purpose of convenience, with the understanding that such reference includes trucks, trailers, tractor-trailers, semi-trailers, and the like.

Axle/suspension system 13 is typically mounted on a pair of longitudinally-extending spaced-apart main members (not shown) of a heavy-duty vehicle, which is generally representative of various types of frames used for heavy-duty vehicles, including primary frames that do not support a subframe and primary frames and/or floor structures that do support a subframe.

Axle/suspension system 13 includes a pair of prior art suspension assemblies 14. Because axle/suspension system 13 generally includes an identical pair of suspension assemblies 14, for purposes of clarity and conciseness, only one of the suspension assemblies will be described below. Each suspension assembly 14 includes a trailing arm beam 16, which is pivotally connected to a respective one of a pair of transversely spaced hangers 12 that are mounted to and depend from a respective main member of the frame or subframe (not shown) of the heavy-duty vehicle. More specifically, beam 16 includes a front end 18 having a pivot connection 20, which is utilized to pivotally connect the beam to a respective one of hangers 12. Beam 16 also includes a rear end 22. Rear end 22 of beam 16 is formed with a pair of transversely aligned openings 27 (only one shown). A central tube 26 of an axle 24 is disposed through openings 27 of each beam 16 and extends transversely between and is rigidly attached to the beams via welds or other suitable means.

Axle 24 includes a pair of axle spindles (not shown). Each one of the pair of axle spindles is attached to a respective one of the ends of central tube 26 of axle 24 and extends outboardly from the central tube. Each suspension assembly 14 also includes an air spring 30, or other suitable force reacting suspension component. Air spring 30 is mounted on rear end 22 of beam 16 and extends between and is connected to a respective one of the heavy-duty vehicle frame or subframe main members. A shock absorber 32 is mounted to each beam 16 and extends between and is attached to a respective one of hangers 12 via a clevis 28 and a fastener 29.

A wheel end assembly 34 is mounted on each axle spindle. For purposes of conciseness and clarity, only one axle spindle and its respective wheel end assembly 34 will be described. Wheel end assembly 34 includes a wheel hub 36. Wheel hub 36 includes a bearing assembly having inboard bearings (not shown) and outboard bearings (not shown) mounted on the outboard end of the axle spindle. Wheel hub 36 is rotatably mounted on the axle spindle via the inboard and outboard bearings, as is known. A spindle nut assembly (not shown) engages the outboard end of the axle spindle and secures wheel hub 36 and the inboard and outboard bearings in place. A hub cap 38 is attached to the outboard end of wheel hub 36 with a plurality of fasteners 39. Each one of fasteners 39 passes through a respective one of a plurality of openings (not shown) formed in hub cap 38, and threadably engages a respective one of a plurality of aligned threaded openings (not shown) formed in wheel hub 36. In this manner, hub cap 38 closes the outboard end of wheel hub 36, and thus wheel end assembly 34. A main continuous seal (not shown) is rotatably mounted on the inboard end of the wheel hub 36 and closes the inboard end of the wheel hub, and thus wheel end assembly 34 to maintain lubricant in the wheel end assembly, as is known.

A tire rim or a pair of tire rims (not shown), depending on specific design characteristics, is mounted on a plurality of threaded bolts 42 of wheel hub 36, and is secured thereon with mating nuts (not shown). A tire (not shown) is mounted on each respective tire rim, as is known.

Figure 2:
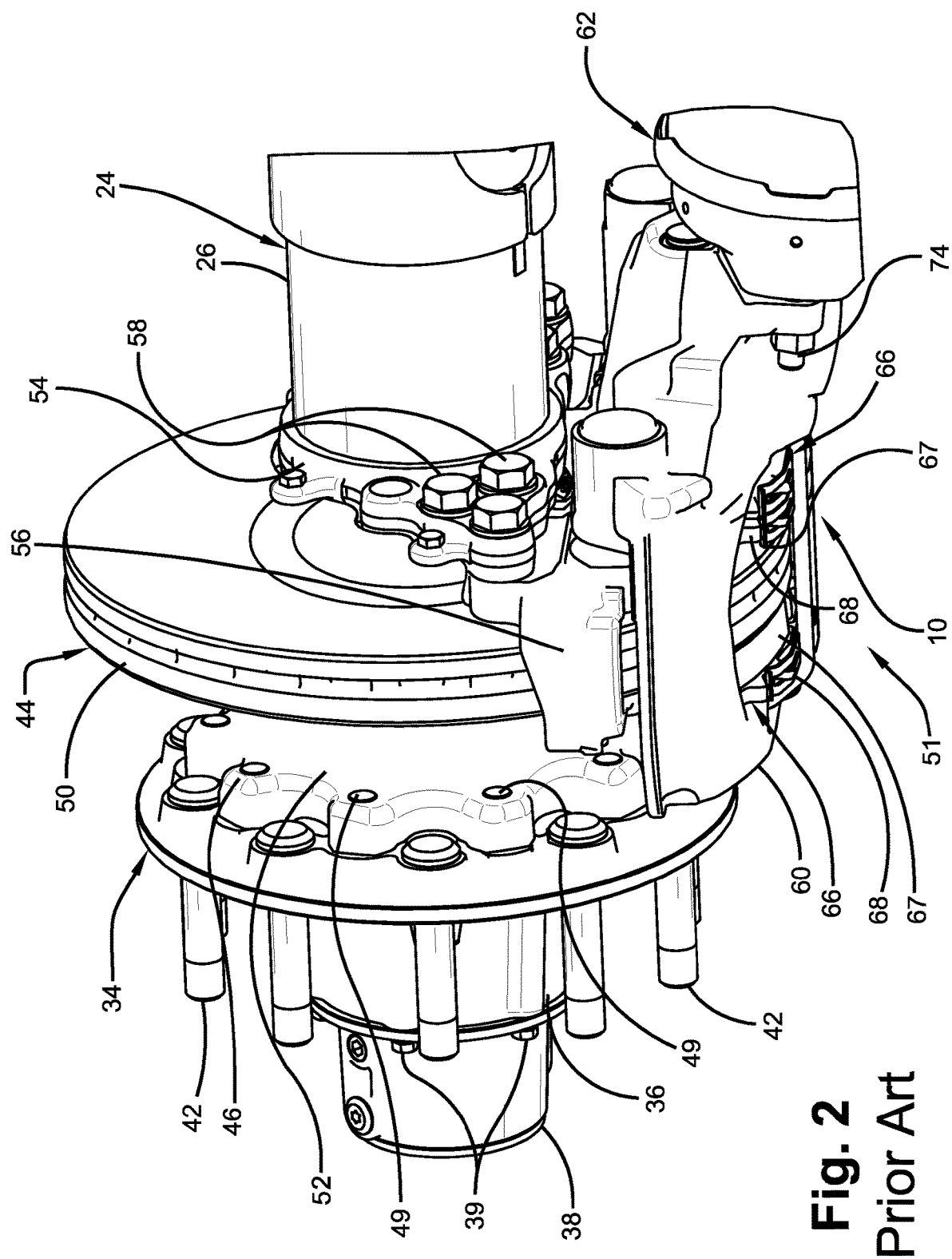
FIG. 2 is a fragmentary perspective view looking in an outboard direction of a portion of the axle/suspension system of FIG. 1, showing the disc air brake system and a respective wheel end assembly mounted on the axle.
Figure 3:
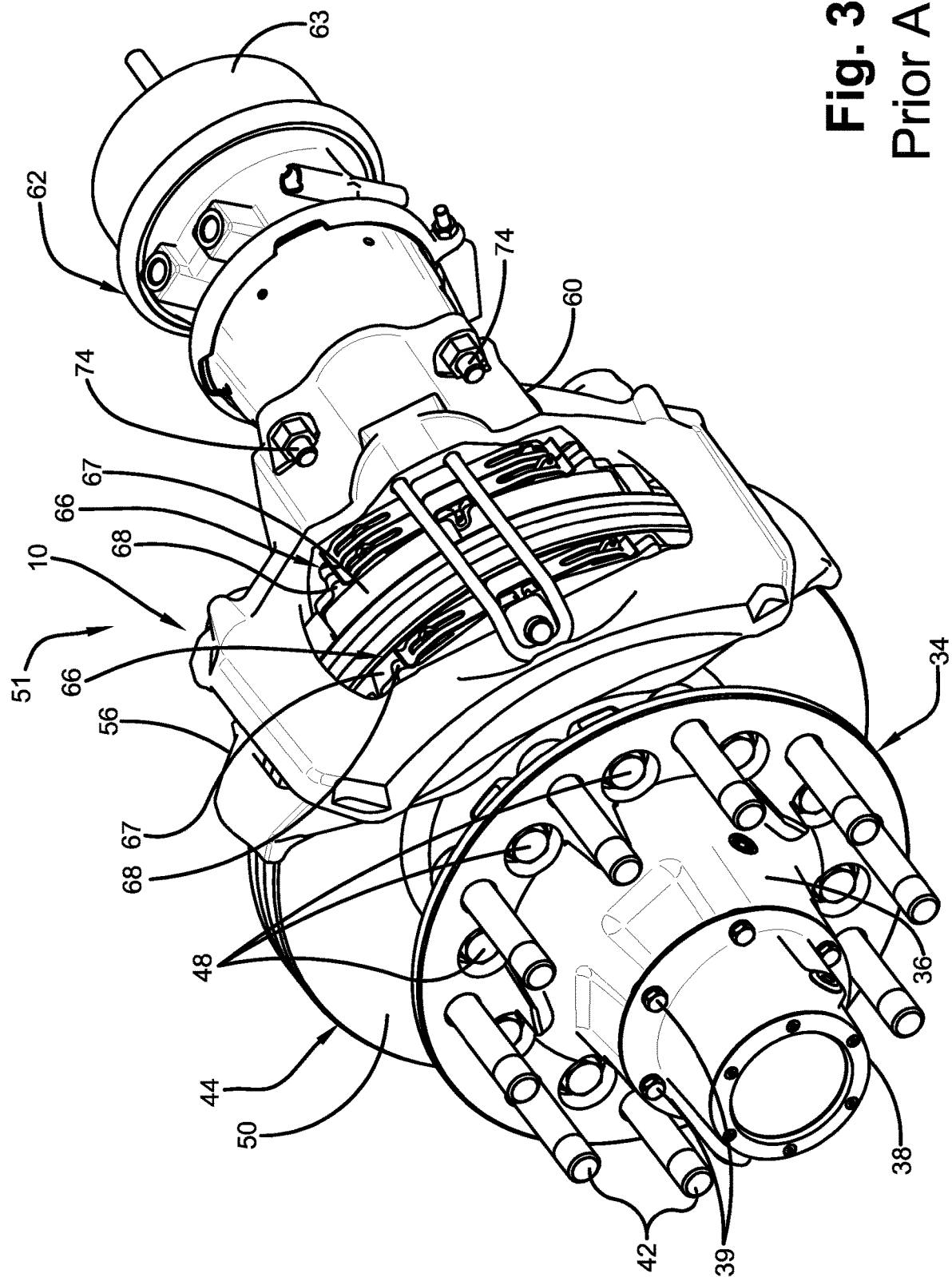
FIG. 3 is a bottom perspective view of one of the wheel end assemblies illustrated in FIG. 1 removed from the axle, showing the orientation of the actuator and caliper relative to the wheel end assembly.

Axle/suspension system 13 includes a disc air brake system 51 to provide braking during operation of the heavy-duty vehicle. Disc air brake system 51 includes a pair of disc brake assemblies 10, with each disc brake assembly being mounted adjacent a respective wheel end of axle/suspension system 13. Inasmuch as disc brake assemblies 10 are similar, for purposes of conciseness and clarity, only one of the brake assemblies will be described in detail. A rotor 44 of disc brake assembly 10 is attached to wheel end assembly 34. With reference to FIG. 2, rotor 44 includes a radially-extending mounting portion or flange 46. Flange 46 is formed with a plurality of openings 49 (FIG. 2) to receive suitable fasteners 48 (FIG. 3), such as bolts. Wheel hub 36 is formed with openings (not shown) which correspond to plurality of openings 49 of flange 46. Fasteners 48 pass through aligned ones of the wheel hub openings and flange openings 49 to removably secure rotor 44 to wheel hub 36. With reference to FIGS. 1-3, rotor 44 also includes a radially extending disc portion 50. An axially-extending sleeve 52 of rotor 44 is integrally formed with and extends between disc portion 50 and flange 46. Sleeve 52 of rotor 44 enables disc portion 50 to be rigidly connected to flange 46, and thus wheel hub 36. This construction enables rotor 44 to rotate with wheel hub 36, while being removable from the wheel hub for servicing.

Disc brake assembly 10 includes a torque plate 54. Torque plate 54 is welded or otherwise rigidly attached to central tube 26 of axle 24 outboard of beam 16. A carrier 56 of disc brake assembly 10 is mechanically fastened to a plurality of openings (not shown) formed in torque plate 54 with bolts 58 (FIG. 2) or other mechanical means. Disc brake assembly 10 includes a caliper 60, which is slidably connected to carrier 56 via a pair of guide pins (not shown) attached to the carrier. Caliper 60 is formed with one or more bore(s) (not shown) for receiving one or more piston(s) (not shown). Caliper 60 is also formed with a pair of openings (not shown) for attaching a brake actuator 62.

With reference to FIG. 3, brake actuator 62 typically includes a brake air chamber 63, which is in fluid communication with a compressed air source (not shown) of the heavy-duty vehicle via a pneumatic supply line (not shown) and activates movement of the one or more piston(s) through a sealed mechanical actuation mechanism (not shown) that amplifies the force between the one or more piston(s). With reference to FIGS. 2-3, brake actuator 62 is mounted on caliper 60 in a cantilevered fashion by a pair of mounting studs 74 disposed through the pair of openings (not shown) formed in the caliper. Caliper 60 also includes an outboard pad seat (not shown) that is disposed opposite the one or more piston(s), as is known. A pair of brake pads 66 are seated in carrier 56 on opposing sides of disc portion 50 of rotor 44, with one of the brake pads being adjacent the piston(s) of caliper 60 and the other brake pad being adjacent the outboard pad seat of the caliper. Each one of pair of brake pads 66 includes friction material 67 that is mounted on a backing plate 68. One of the pair of brake pads 66 is seated in caliper 60 outboard of disc portion 50 of rotor 44 adjacent the outboard pad seat and the other brake pad is seated in the caliper inboard of the disc portion.

During travel of the heavy-duty vehicle, when disc air brake system 51 is engaged, compressed air flows to brake air chamber 63 of brake actuator 62 via the pneumatic supply line. Actuation of brake actuator 62 causes outboard movement of the one or more pistons of caliper 60, which in turn forces friction material 67 of brake pad 66 adjacent the one or more piston(s) outboardly against the inboard surface of disc portion 50 of rotor 44. As brake pad 66 adjacent the one or more piston(s) is forced against the inboard surface of disc portion 50, because caliper 60 slidably engages carrier 56 via the guide pins, the caliper is forced inboardly, which in turn forces friction material 67 of brake pad 66 adjacent the outboard pad seat against the outboard surface of the disc portion. Together, contact of brake pads 66 against the outboard and inboard surfaces of disc portion 50 of rotor 44 slows and/or stops rotation of the rotor, and thus slows and/or stops rotation of wheel hub 36 and the vehicle wheel.

As previously mentioned, brake actuator 62 is attached directly to caliper 60 in a cantilevered fashion by pair of mounting studs 74. Brake actuator 62 is typically mounted on the inboard side of caliper 60 and extends inboardly from the caliper. With reference to FIG. 1, this arrangement results in brake actuator 62 being located behind and/or beneath a respective beam 16 and/or axle 24 of axle/suspension system 13. The location of brake actuator 62 behind and/or beneath beam 16 and/or axle 24 potentially creates an undesirable relatively low level of clearance between brake air chamber 63 of the brake actuator and the ground, which can potentially result in the brake chamber or other components of the brake actuator being damaged by hitting uneven ground or other structures protruding up from the ground, or being struck with road debris during vehicle operation.

Moreover, the location of brake actuator 62 and caliper 60 behind and/or beneath beam 16 and/or axle 24 of axle/suspension system 13 may potentially cause the interface of the brake actuator to the caliper to be subjected to high accelerations from road input forces during movement of the beam during vehicle operation due to higher angular acceleration associated with being positioned a greater distance from the beam pivot. This location of brake actuator 62 and caliper 60 can lead to increased stress at the brake actuator-to-caliper interface and can compromise the interface and potentially increase the opportunity for contamination of the brake actuator and/or caliper from the harsh road environment. Furthermore, where roads are treated with salt, chip-seal compounds, and/or other materials that may be harmful to caliper 60 and/or brake actuator 62, when mixed with water from the road, such contaminants may be splashed/sprayed onto the caliper and/or brake actuator when the caliper and brake actuator are positioned behind and/or beneath beam 16 and/or axle 24 of axle/suspension system 13 during operation of the vehicle, and over time, may corrode or damage the caliper and/or brake actuator. If the interface between brake actuator 62 and caliper 60 is compromised, such contaminants can also enter into the brake actuator and/or caliper and potentially damage the components. In addition, because brake actuator 62 and caliper 60 are located behind and/or beneath beam 16 and/or axle 24 of axle/suspension system 13, the pneumatic supply lines (not shown) for the brake actuator are positioned relatively close to the ground, where they can potentially be exposed to road debris and road hazards that could potentially cause damage to the pneumatic supply lines, which in turn could potentially cause malfunction or inoperability of the brake actuator, and thus disc brake assembly 10.

As a result, there is a need in the art for a suspension assembly for heavy-duty vehicle axle/suspension systems that provides improved protection of the brake actuator, improved integrity of the brake actuator-to-caliper interface and improved pneumatic supply line configuration, while maintaining critical clearances between certain components of the suspension assembly and the brake system, maintaining a precise position of the brake actuator radially from the centerline of the axle and maintaining proper reaction of critical in-service loads by the beam of the suspension assembly during operation of the vehicle. It also would be advantageous to have a suspension assembly that allows the brake actuator to be mounted in line with and/or near the caliper to reduce the number and/or length of components needed for the brake actuator to activate the disc brakes. The suspension assembly with disc brake actuator protection of the subject disclosure according to at least one aspect of the disclosed subject matter satisfies these needs, and will now be described.

An exemplary embodiment suspension assembly with disc brake actuator protection of the subject disclosure is shown in FIGS. 4-7, and is indicated generally at 114. Exemplary embodiment suspension assembly with disc brake actuator protection 114 is typically one of a pair of identical suspension assemblies utilized with a heavy-duty vehicle integrated axle/suspension system, like prior art suspension assemblies 14 of axle/suspension system 13 (FIGS. 1-3). For purposes of conciseness and clarity, only one exemplary embodiment suspension assembly 114 will be described below.

Figure 4:
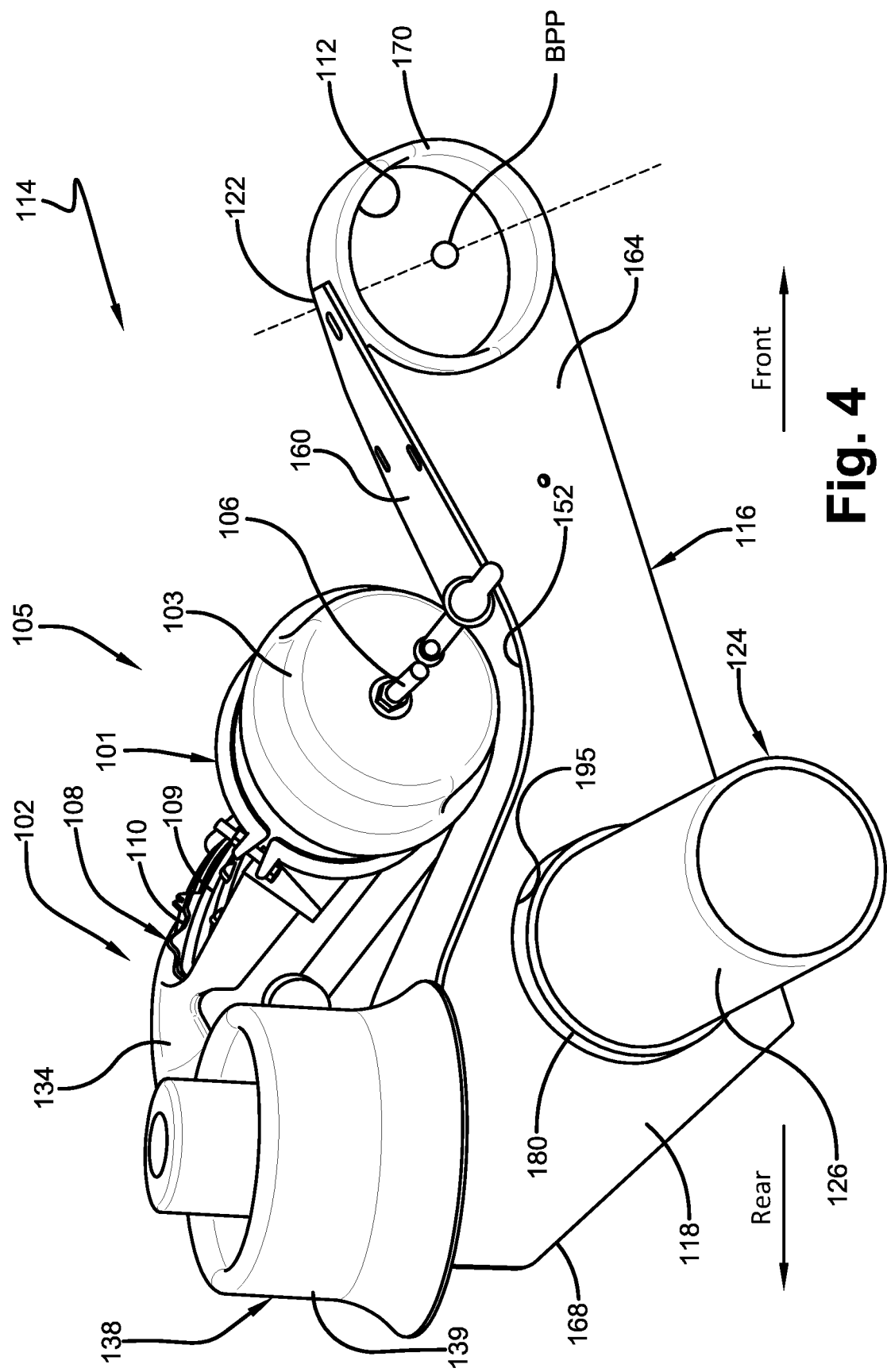
FIG. 4 is a fragmentary top rear perspective view looking in an outboard direction, of an exemplary embodiment suspension assembly with disc brake actuator protection, showing a brake actuator mounted within a top recessed portion of a beam of the suspension assembly and the beam capturing the axle of an axle/suspension system.
Figure 5:
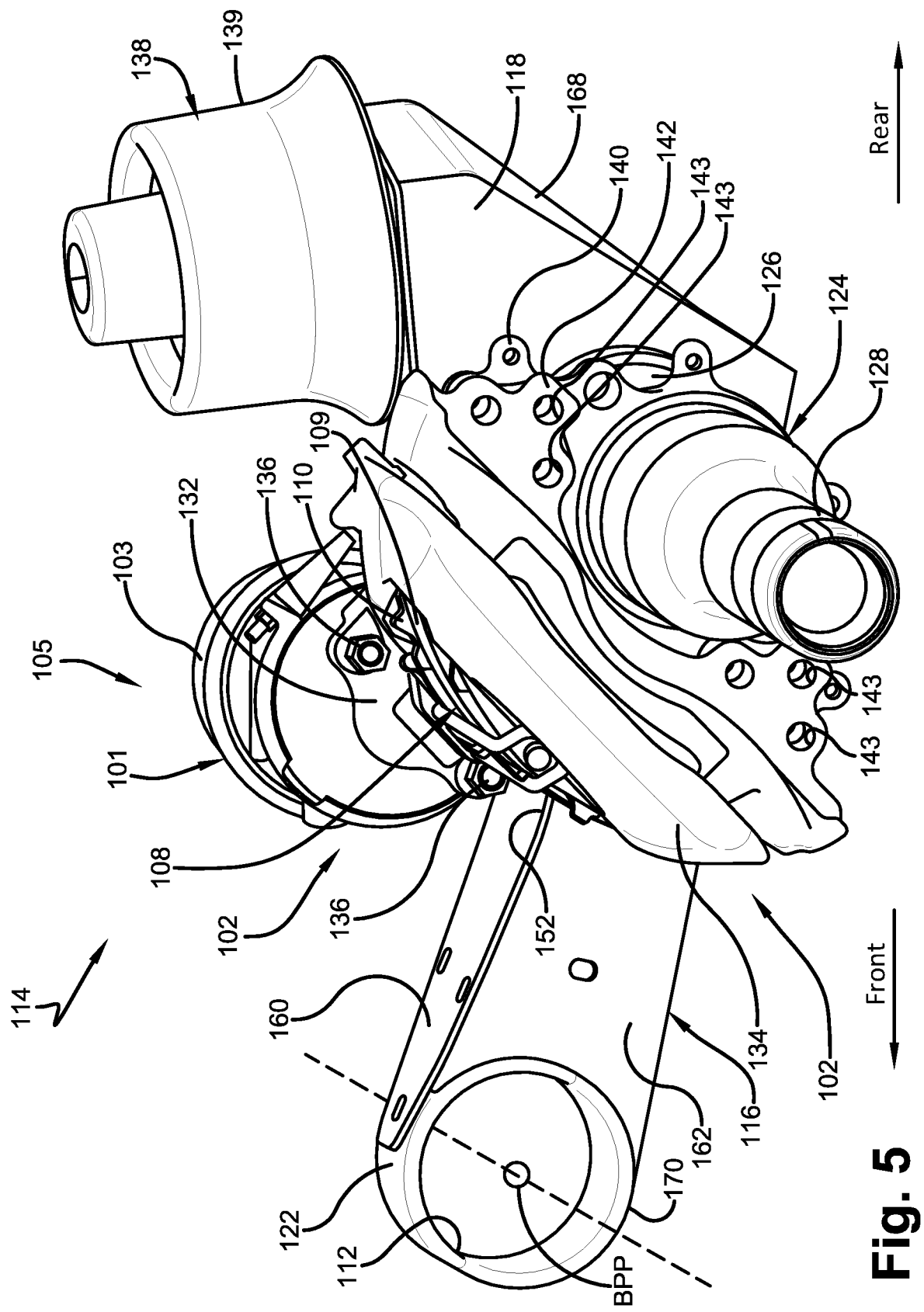
FIG. 5 is a top rear perspective view looking in an inboard direction, of the exemplary embodiment suspension assembly with disc brake actuator protection shown in FIG. 4.
Figure 6:
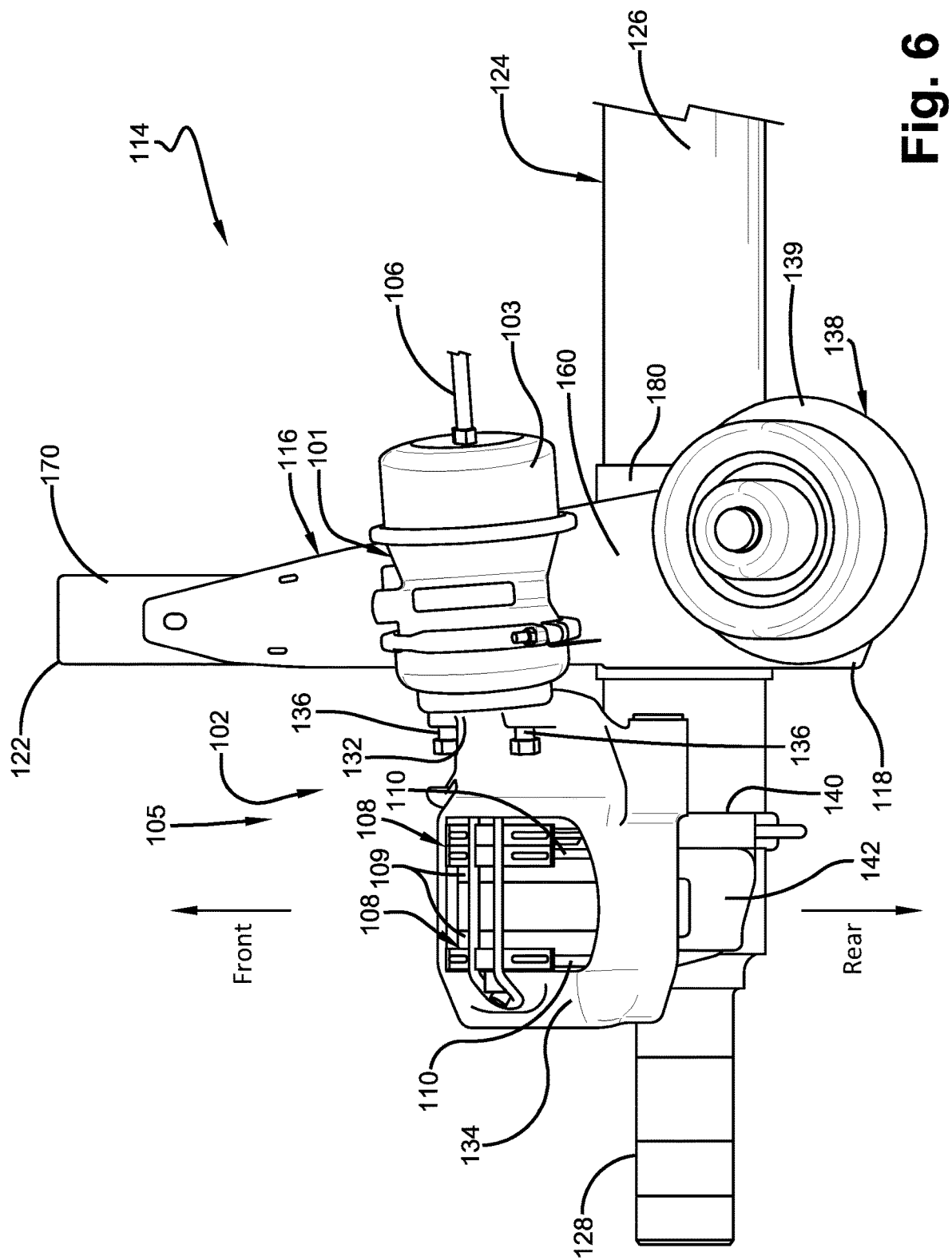
FIG. 6 is a fragmentary top plan view of the exemplary embodiment suspension assembly with disc brake actuator protection shown in FIG. 4, showing the brake actuator positioned above the beam of the suspension assembly.
Figure 7:
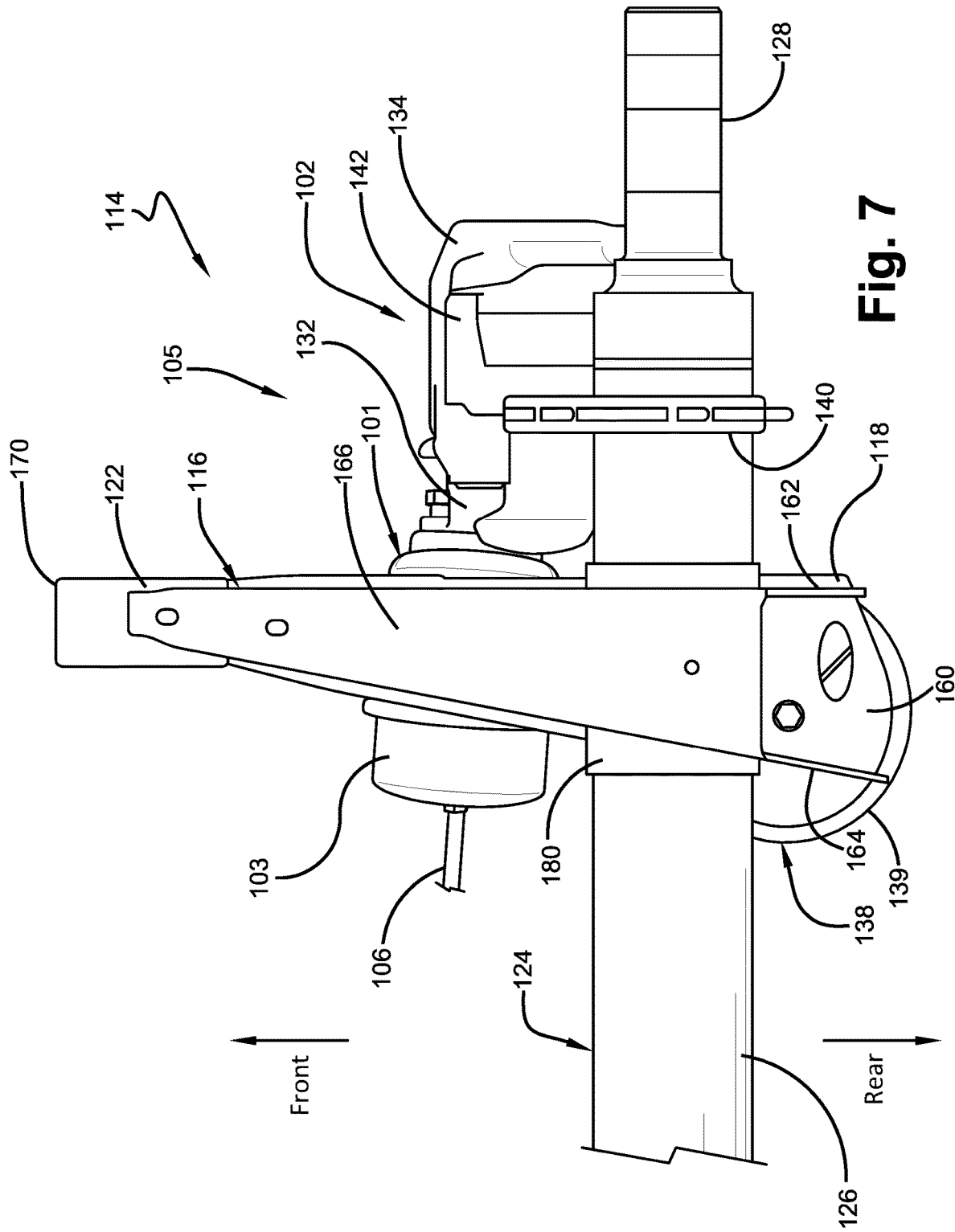
FIG. 7 is a fragmentary bottom plan view of the exemplary embodiment suspension assembly with disc brake actuator protection shown in FIG. 4.
Figure 8:
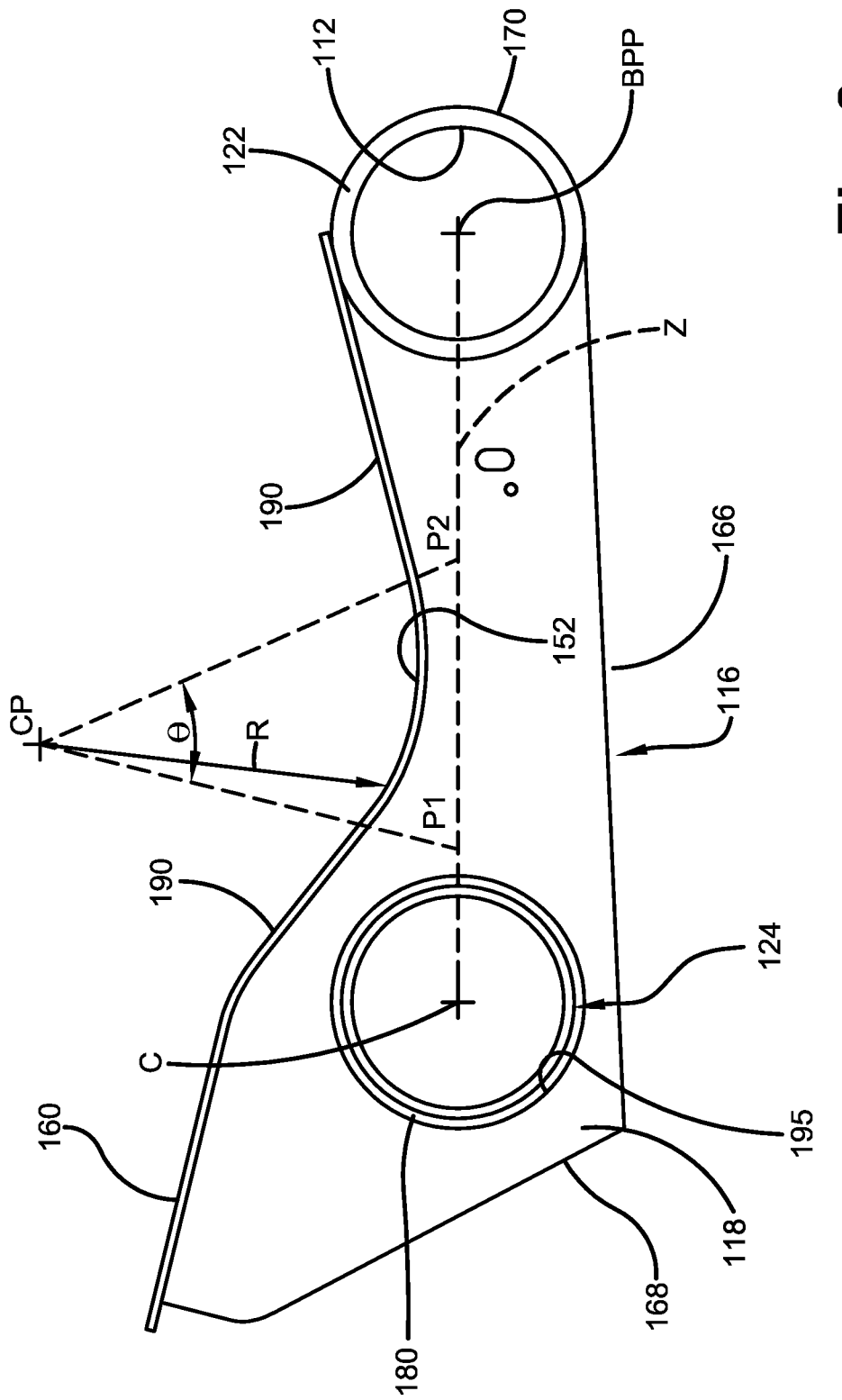
FIG. 8 is an elevational view of the beam of the exemplary embodiment suspension assembly with disc brake actuator protection shown in FIG. 4, showing the recess formed in the top of the beam for accommodating the brake actuator.

Exemplary embodiment suspension assembly with disc brake actuator protection 114 includes a longitudinally extending elongated beam 116, the structure of which will be described in greater detail below. Beam 116 is pivotally connected to a respective one of a pair of transversely spaced hangers (not shown) that are mounted to and depend from a respective main member of a frame or subframe (not shown) of the heavy-duty vehicle. More specifically, beam 116 includes a front end 122 having a bushing assembly (not shown), which is utilized to pivotally connect the beam to a respective one of the hangers. Beam 116 may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of the vehicle. With reference to FIGS. 4-5 and 8, the pivotal attachment of beam 116 to the hanger creates a beam pivot point (BPP) about which the beam may pivot. Beam 116 also includes a rear end 118, which is welded or otherwise rigidly attached to a central tube 126 of an axle 124 extending transversely between the beams of the identical exemplary embodiment suspension assemblies 114.

Axle 124 includes a pair of axle spindles 128. Each one of pair of axle spindles 128 is attached to a respective one of the ends of central tube 126 and extends outboardly from the central tube. A wheel end assembly (not shown), such as wheel end assembly 34 described above (FIGS. 1-3), is mounted on each one of axle spindles 128 in a known manner.

Exemplary embodiment suspension assembly with disc brake actuator protection 114 also includes an air spring 138 (only a piston 139 of the air spring is shown), or other suitable force reacting suspension component, mounted on rear end 118 of beam 116. Air spring 138 extends between and is connected to a respective one of the heavy-duty vehicle frame or subframe main members (not shown). Exemplary embodiment suspension assembly 114 can also include a shock absorber (not shown) mounted to beam 116 and extending between and being attached to the hanger or frame or subframe main members.

The axle/suspension system incorporating pair of exemplary embodiment suspension assemblies with disc brake actuator protection 114 includes a disc air brake system 102 with a disc brake assembly 105 mounted adjacent each wheel end of the axle/suspension system to provide braking during operation of the heavy-duty vehicle. Disc air brake system 102 and disc brake assemblies 105 are similar in structure and function to disc air brake system 51 and disc brake assemblies 10, respectively, described above (FIGS. 1-3). Inasmuch as disc brake assemblies 105 are similar, for purposes of conciseness and clarity, only one disc brake assembly will be described in detail.

Disc brake assembly 105 includes a rotor (not shown), such as rotor 44 described above (FIGS. 1-3), that is rigidly connected to the wheel hub (not shown) of the wheel end assembly for rotation about axle spindle 128 of axle 124. Disc brake assembly 105 also includes a torque plate 140. Torque plate 140 is welded or otherwise rigidly attached to central tube 126 of axle 124 outboard of beam 116. A carrier 142 of disc brake assembly 105 includes a plurality of openings 143 that align with a plurality of corresponding openings (not shown) formed in torque plate 140 and is mechanically fastened thereto by bolts (not shown) or other mechanical means. Disc brake assembly 105 includes a caliper 134, which is slidably connected to carrier 142 via a pair of guide pins (not shown) attached to the carrier. Caliper 134 is formed with one or more bore(s) (not shown) for receiving one or more pistons(s) (not shown). Caliper 134 is also formed with a pair of openings (not shown) for attaching a brake actuator 101 of disc brake assembly 105.

Brake actuator 101 includes a brake air chamber 103, which is in fluid communication with a compressed air source (not shown) of the heavy-duty vehicle via a pneumatic supply line 106 (FIGS. 6-7), and activates movement of the one or more piston(s) through a sealed mechanical actuation mechanism (not shown) that amplifies the force between the one or more piston(s). It will be appreciated that in some disc brake assembly constructions, the caliper may be slidably connected directly to a torque plate without affecting the overall concept or operation of the disclosed subject matter. Brake actuator 101 is attached to one or more cantilevers 132 formed as part of caliper 134 utilizing bolts 136, or any other suitable means known in the art. Caliper 134 also includes an outboard pad seat (not shown) that is disposed opposite the one or more piston(s). A pair of brake pads 108 are seated in carrier 142 on opposing sides of a disc portion (not shown) of the rotor, with one of the brake pads being adjacent the one or more piston(s) of caliper 134 and the other brake pad being adjacent the outboard pad seat of the caliper. Each one of pair of brake pads 108 includes friction material 109 mounted on a backing plate 110. One of pair of brake pads 108 is seated in caliper 134 outboard of the disc portion of the rotor adjacent the outboard pad seat and the other brake pad is seated in the caliper inboard of the disc portion. Engagement of disc brake assembly 105 causes contact of friction material 109 of brake pads 108 against the outboard and inboard surfaces of the disc portion (not shown) of the rotor to slow and/or stop rotation of the rotor, and thus the wheel hub and the vehicle wheel.

Beam 116 includes a top wall 160, an outboard sidewall 162, an inboard sidewall 164, a bottom wall 166, and a rear wall 168. A mounting tube 170 is formed at or is rigidly attached to the front end of beam 116. Mounting tube 170 includes an opening 112 that enables pivotal connection to the respective hanger. Top wall 160 of beam 116 is curved downwardly frontwardly and then upwardly-frontwardly, moving in the direction from air spring piston 138 to its longitudinal central portion to create a recessed area 152, the importance of which will be described in detail below. Top wall 160, outboard and inboard sidewalls 162, 164, bottom wall 166, and rear wall 168 may be formed out of any suitable rigid material, such as a metal. For example, top wall 160, outboard and inboard sidewalls 162, 164, bottom wall 166, and rear wall 168 may be cut from flat sheets of steel and then welded together. Alternatively, two or more of top wall 160, outboard and inboard sidewalls 162, 164, bottom wall 166, and rear wall 168 may be formed as a single piece of steel and then bent to form two or more wall surfaces. For example, outboard and inboard sidewalls 162, 164 and bottom wall 166 may be formed from a single sheet of metal whereby the sidewalls are bent 90 degrees from bottom wall 166 into a general U-shape to form the three walls. In some configurations, top wall 160 and bottom wall 166 may overlap outboard and inboard sidewalls 162, 164. Mounting tube 170 may be formed by cutting it from a section of circular metal having a suitable diameter. Those of ordinary skill in the art will appreciate that top wall 160, outboard and inboard sidewalls 162, 164, bottom wall 166, rear wall 168, and/or mounting tube 170 of beam 116 may be formed from other materials, shaped in other ways, connected together in other ways, and/or even be formed from a single piece of material, such as a composite, and printed with a 3-D printer, for example.

Outboard and inboard sidewalls 162, 164 are each formed with a respective one of a pair of transversely aligned beam openings 195. Central tube 126 of axle 124 is disposed through beam openings 195. A pair of axle wraps 180 are welded or otherwise rigidly attached to central tube 126 of axle 124 and are transversely spaced from one another on the central tube such that each one of the pair of wraps is disposed between the beam openings 195 of a respective beam 116. Each axle wrap 180 in turn is circumferentially welded or otherwise rigidly attached to its respective beam 116 at beam openings 195 to rigidly attach each beam to axle 124 with the axle being substantially surrounded by outboard and inboard sidewalls 162, 164 of each beam.

In accordance with an important aspect of the disclosed subject matter, exemplary embodiment suspension assembly with disc brake actuator protection 114 provides a means to protect components of disc brake assembly 105 of disc air brake system 102. More specifically, top wall 160 of beam 116 includes a central portion that has a generally concave downward curvature when viewed from the driver side or passenger side of the vehicle. Outboard and inboard sidewalls 162, 164 have curved/concave top edges 190 (FIG. 8) similar/complementary to top wall 160 such that the top wall 160 is snugly positioned on the sidewalls. Together, the generally concave downward curvature of top wall 160 and corresponding curved/concave top edges 190 of outboard and inboard sidewalls 162, 164 form recessed area 152.

Recessed area 152 enables disc brake assembly 105 to be mounted on axle 124 such that brake actuator 101 extends inboardly from its connection to caliper 134 above beam 116 at least partially within or disposed adjacent the recessed area. Because brake actuator 101 is positioned above beam 116 at least partially within or disposed adjacent recessed area 152, a greater distance exists between the ground and the brake actuator, reducing the opportunity for road debris to come into contact with the brake actuator and damage the brake actuator during operation of the vehicle. Furthermore, because brake actuator 101 is positioned at least partially within or disposed adjacent recessed area 152, and axle 124 is positioned below brake actuator 101, a majority of the structure of brake actuator 101 is shielded/protected by the axle/suspension system by nature of the geometry enabled by exemplary embodiment suspension assembly with disc brake actuator protection 114. This location of brake actuator 101 provides increased protection to the brake actuator and prevents or minimizes damage to the brake actuator and/or other components of disc brake assembly 105, such as caliper 134, from raised road surface and/or road debris encountered during operation of the vehicle. It is to be understood that the generally concave downward curvature of top wall 160 and curved/concave top edges 190 of outboard and inboard sidewalls 162, 164 may be any suitable shape to create a desired recessed area 152 that brake actuator 101 may at least partially be disposed within or be disposed adjacent to the recessed area.

With reference to FIG. 8, recessed area 152 is preferably positioned above a line Z drawn through beam pivot point BPP and a center C of axle 124. More preferably, recessed area 152 is positioned at least about 0.50" above line Z drawn through beam pivot point BPP and center C of axle 124. Most preferably, recessed area 152 is positioned at least about 0.70" above line Z drawn through beam pivot point BPP and center C of axle 124. However, depending on desired configuration(s) of the axle/suspension system and/or overall configurations of exemplary embodiment suspension assemblies 114, other desired locations of recessed area 152 may be employed. In some configurations, such as that shown, some portion(s) of curved/concave top edges 190 of outboard and inboard sidewalls 162, 164 may trace a generally circular curve. For example, the portion of curved/concave top edges 190 between points P1 and P2 shown in FIG. 8 may be generally circular in shape between the two points with a radius of R and a center point of CP. Thus, the curved portion forms the angle theta θ between P1 and P2. It is to be understood that curved/concave top edges 190 do not need to include continuous curves, but may be partially shaped having a segment of a circle without affecting the overall concept or operation of the disclosed subject matter. Alternatively, each curved/concave top edge 190 may be formed with two or more straight line edges without having any curved portions to form recessed area 152 without affecting the overall concept or operation of the disclosed subject matter.

Thus, the unique structural geometry of exemplary embodiment suspension assembly with disc brake actuator protection 114 provides for an improved arrangement/configuration of air disc brake assembly 105 with brake actuator 101 located above and protected by beam 116. Furthermore, exemplary embodiment suspension assembly with disc brake actuator protection 114 includes a structure and geometry in which outboard and inboard sidewalls 162, 164 of beam 116 substantially surround axle 124, while satisfying minimum beam sidewall section requirements for manufacturability and durability of beam 116 when placed in service. For example, exemplary embodiment suspension assembly 114 includes a structure in which axle wrap 180 is at least about 1" from top wall 160 of beam 116, which reduces strain on the circumferential welds between axle wrap 180 and beam 116. Additionally, the position of air spring 138 relative to beam pivot point BPP of beam 116 and axle 124 of exemplary embodiment suspension assembly 114 provides enhanced dynamic performance to the suspension assembly, and thus axle/suspension system, by providing a more desirable lever arm ratio and enabling the pressure of the air spring to be decreased. For example, exemplary embodiment suspension assembly 114 of the disclosed subject matter includes a lever arm ratio of at least about 1.34, whereas prior art suspension assemblies, such as prior art suspension assembly 14 (FIG. 1), typically include relatively lower lever arm ratios. Furthermore, maintaining a height of outboard and inboard sidewalls 162, 164 above line Z drawn through BPP and center C of axle 124 provides desirable reaction to in-service loads. Thus, the structural/configuration/arrangement factors of exemplary embodiment suspension assembly 114 are balanced, while positioning the brake actuator 101 above and partly forward of axle 124, and forward of air spring 138, while maintaining clearance between beam 116, the air spring, the brake actuator, and caliper 134.

In accordance with another important aspect of exemplary embodiment suspension assembly with disc brake actuator protection 114, the mounting location of brake actuator 101 at least partially within or disposed adjacent recessed area 152 formed by beam 116 enables the brake actuator to be located in line with and/or adjacent caliper 134. Because brake actuator 101 is located in line with and/or adjacent caliper 134, the brake actuator may be used to directly actuate the caliper to engage braking action of the caliper without the need for intermediate components between the brake actuator and the caliper, as used in some prior art systems which activate a brake assembly with a remotely located brake actuator.

Moreover, the structural geometry of prior art suspension assemblies often position disc air brake systems with laterally oriented actuators so that the brake chambers are positioned behind and/or below the axle, as shown and described above with regard to suspension assemblies 14 (FIG. 1), and therefore, are often similar to the geometry of suspension assemblies designed for drum brake systems that utilize S-cam brake shoe actuation. As discussed above, this orientation is not preferred for disc air brake systems. Exemplary embodiment suspension assembly with disc brake actuator protection 114 of the disclosed subject matter improves upon prior art suspension assembly designs by positioning brake actuator 101 at least partially in front of and above axle 124 to provide for a relatively shorter moment arm of brake actuator 101 relative to beam pivot point BPP as compared to prior art suspension assembly designs in which the brake actuator is positioned behind and/or below the axle, such as suspension assemblies 14 (FIG. 1). Because brake actuator 101 is at least partially in front of and above axle 124, and is thus located a shorter distance from beam pivot point BPP, lower angular accelerations at the brake actuator induced by road inputs imparted through axle 124 are experienced, as compared to prior art suspension assemblies in which the brake actuator is positioned behind and/or below the axle. Lower levels of angular acceleration at brake actuator 101 in turn reduces stress at the interface of the brake actuator to caliper 134, which improves the integrity of the interface connection and reduces the opportunity for contamination of caliper 134 and/or the brake actuator from contaminants of harsh road environments.

The positioning of brake actuator 101 at least partially within or disposed adjacent recessed area 152 additionally helps protect the brake actuator from liquid or water spray from the road surface that may contain salt or other unwanted materials that may corrode or otherwise be potentially harmful to the brake actuator. Unlike prior art suspension assemblies where the brake actuator is located below and/or behind the beam, and generally completely exposed to the road surface, such as suspension assemblies 14 (FIG. 1), exemplary embodiment suspension assembly with disc brake actuator protection 114 of the disclosed subject matter positions brake actuator 101 above beam 116, which minimizes or eliminates the potential for contaminants to splash/spray onto components of disc brake assembly 105, such as brake actuator 101 and caliper 134, and corrode or otherwise damage the components.

In addition, brake actuator 101 of the subject disclosure also is optimally positioned to facilitate improved pneumatic supply line routing and may also enable improved air supply to the brake actuator. For example, in axle/suspension system 13 described above (FIGS. 1-3), the pneumatic supply line (not shown) extends from the vehicle air supply (not shown) to prior art brake actuator 62, which is typically situated between prior art suspension assemblies 14 (FIG. 1). Because the pneumatic supply lines are typically secured by each respective manufacturer of the heavy-duty vehicle, the manner in which they are secured may vary significantly across the industry. In contrast, the mounting structure/configuration of exemplary embodiment suspension assembly 114 of the disclosed subject matter enables the connection of the air supply to the brake actuator to be reconfigured, thereby desirably providing more consistency and standardization in the manner of securing the pneumatic supply line and optimizing the location of the pneumatic supply line for protection from road debris. Furthermore, because exemplary embodiment suspension assembly with disc brake actuator protection 114 enables brake actuator 101 to be positioned above beam 116, pneumatic supply line 106 is positioned further away from the road surface, which provides an improved, more protected pneumatic supply line configuration that minimizes or prevents damage to the pneumatic supply line by road debris encountered during operation of the heavy-duty vehicle.

Exemplary embodiment suspension assembly with disc brake actuator protection 114 of the disclosed subject matter also maintains critical clearances between certain components of the suspension assembly and the brake system, maintains a precise position of the brake actuator radially from the centerline of axle 124, and maintains proper reaction of critical in-service loads by beam 116 of the suspension assembly during operation of the vehicle.

In summary, the suspension assembly with disc brake actuator protection for a heavy-duty vehicle axle/suspension system of the disclosed subject matter enables a disc brake actuator to be positioned at least partially within a recessed area formed on the top of a beam of the suspension assembly, which provides increased protection to the brake actuator during operation of the vehicle, improves the integrity of the interface between the brake actuator and the caliper, and provides an improved, more protected pneumatic supply line configuration, while maintaining critical clearances between certain components of the suspension assembly and the brake system, maintaining a precise position of the brake actuator radially from the centerline of the axle, and maintaining proper reaction of critical in-service loads by the beam of the suspension assembly during operation of the vehicle. The suspension assembly of the disclosed subject matter also allows the brake actuator to be mounted in line with and/or near the caliper to reduce the number and/or length of components needed for the brake actuator to active the disc brakes.

Accordingly, the suspension assembly with disc brake actuator protection of the disclosed subject matter provides an effective, inexpensive, and efficient suspension assembly which eliminates difficulties, disadvantages and drawbacks encountered with prior art suspension assemblies that mount a brake actuator behind and/or below the beam.

The subject disclosure may also include a method of mounting brake actuator 101 above or adjacent exemplary embodiment suspension assembly with disc brake actuator protection 114. The method includes steps in accordance with the description that is presented above and shown in FIGS. 4-8.

It is to be understood that the structure and arrangement of exemplary embodiment suspension assembly with disc brake actuator protection 114 of the subject disclosure may be altered or rearranged without affecting the overall concept or operation of the subject disclosure. In addition, exemplary embodiment suspension assembly 114 of the subject disclosure may be employed with other types of axles, wheel end assemblies, axle/suspension systems, and/or brake assemblies than those shown and described, without affecting the overall concept, function or operation of the subject disclosure. For example, in the above description, exemplary embodiment suspension assembly 114 is described as being utilized with disc brake assembly 105, which includes a configuration in which caliper 134 is slidably connected to carrier 142, which in turn is rigidly connected torque plate 140 by bolts 136. It is to be understood that other brake system configurations may be employed without affecting the overall concept or operation of the subject disclosure, such as the use of an integrated, single-component carrier and torque plate or a caliper attached directly to the torque plate. Also, it is contemplated that the disclosed subject matter can be incorporated in heavy-duty vehicles having various axle ratings, without changing the overall concept or operation of the disclosed subject matter. Moreover, while reference has been made generally to a heavy-duty vehicle for the purpose of convenience, it has been with the understanding that such reference includes trucks, trailers, tractor-trailers, semi-trailers, and the like.

Accordingly, the suspension assembly with disc brake actuator protection of the subject disclosure is simplified, provides an effective, safe, inexpensive, and efficient structure which achieves all the enumerated objectives, provides for eliminating difficulties encountered with prior art axle/suspension systems, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the disclosed subject matter has been described with reference to a specific embodiment. It shall be understood that this illustration is by way of example and not by way of limitation, as the scope of the invention is not limited to the exact details shown or described. Potential modifications and alterations will occur to others upon a reading and understanding of the subject disclosure, and it is understood that the disclosed subject matter includes all such modifications and alterations and equivalents thereof.

Having now described the features, discoveries and principles of the disclosed subject matter, the manner in which the suspension assembly with disc brake actuator protection is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A suspension assembly for a heavy-duty vehicle integrated axle/suspension system, said suspension assembly comprising:
    a beam, said beam being pivotally connected to a frame of said heavy duty vehicle adjacent a first end of the beam, an axle of said heavy-duty vehicle being rigidly attached to the beam;
    a force reacting suspension component mounted adjacent a second end of the beam, said force reacting suspension component also being connected to said frame;
    a recessed area formed in a top surface of said beam, a brake system component is entirely positioned above at least a portion of the beam adjacent the recessed area, said recessed area protecting said brake system component from road debris and contaminants.

2. The suspension assembly for a heavy-duty vehicle integrated axle/suspension system of claim 1, wherein said recessed area is formed by a geometry of the connection of a top wall of said beam to an inboard sidewall and an outboard sidewall of the beam.

3. The suspension assembly for a heavy-duty vehicle integrated axle/suspension system of claim 2, wherein said recessed area has a generally curved shaped.

4. The suspension assembly for a heavy-duty vehicle integrated axle/suspension system of claim 1, wherein said force reacting suspension component is an air spring.

5. The suspension assembly for a heavy-duty vehicle integrated axle/suspension system of claim 1, wherein said brake system component is a brake actuator.

6. The suspension assembly for a heavy-duty vehicle integrated axle/suspension system of claim 5, wherein said brake actuator extends inboardly from a cantilevered connection to a caliper of said brake system and is positioned above said beam partially within or adjacent said recessed area.

7. The suspension assembly for a heavy-duty vehicle integrated axle/suspension system of claim 2, wherein said inboard sidewall and said outboard sidewall are formed with transversely aligned openings, said axle being disposed through said openings and being substantially surrounded by said beam.

8. The suspension assembly for a heavy-duty vehicle integrated axle/suspension system of claim 7, further comprising an axle wrap disposed around said axle, said wrap being disposed through said transversely aligned openings and rigidly attaching the axle to said beam.

9. The suspension assembly for a heavy-duty vehicle integrated axle/suspension system of claim 8, wherein said axle wrap is at least 1 inch from said top wall.

10. The suspension assembly for a heavy-duty vehicle integrated axle/suspension system of claim 7, wherein said recessed area is positioned above a line drawn through a center of said axle and a pivot point of said beam.

11. The suspension assembly for a heavy-duty vehicle integrated axle/suspension system of claim 7, wherein said recessed area is positioned at least 0.50 inches above a line drawn through a center of said axle and a pivot point of said beam.

12. The suspension assembly for a heavy-duty vehicle integrated axle/suspension system of claim 7, wherein said recessed area is positioned at least 0.70 inches above a line drawn through a center of said axle and a pivot point of said beam.

13. The suspension assembly for a heavy-duty vehicle integrated axle/suspension system of claim 1, wherein said suspension assembly includes a lever arm ration of at least about 1.34.

14. A suspension assembly for a heavy-duty vehicle integrated axle/suspension system, said suspension assembly comprising:
- a beam, said beam being pivotally connected to a frame of said heavy duty vehicle adjacent a first end of the beam, an axle of said heavy-duty vehicle being rigidly attached to the beam;
- a force reacting suspension component mounted adjacent a second end of the beam, said force reacting suspension component also being connected to said frame;
- a recessed area formed on a surface of said beam, said recessed area positioned above a line drawn through a center of said axle and a pivot point of said beam, a brake system component is positioned above at least a portion of the beam adjacent the recessed area, said recessed area protecting said brake system component from road debris and contaminants.

15. A suspension assembly for a heavy-duty vehicle integrated axle/suspension system, said suspension assembly comprising:
- a beam, said beam being pivotally connected to a frame of said heavy duty vehicle adjacent a first end of the beam, an axle of said heavy-duty vehicle being rigidly attached to the beam;
- a force reacting suspension component mounted adjacent a second end of the beam, said force reacting suspension component also being connected to said frame;
- a recessed area formed on a surface of said beam, brake actuator is positioned above at least a portion of the beam adjacent the recessed area, said recessed area protecting said brake actuator from road debris and contaminants, wherein said brake actuator extends inboardly from a cantilevered connection to a caliper of a brake system and is positioned above said beam partially within or adjacent said recessed area.

16. A suspension assembly for a heavy-duty vehicle integrated axle/suspension system, said suspension assembly comprising:
- a beam, said beam being pivotally connected to a frame of said heavy duty vehicle adjacent a first end of the beam, an axle of said heavy-duty vehicle being rigidly attached to the beam;
- a force reacting suspension component mounted adjacent a second end of the beam, said force reacting suspension component also being connected to said frame;
- a recessed area formed on a surface of said beam, said recessed area formed by a geometry of a connection of a top wall of said beam to an inboard sidewall and an outboard sidewall of the beam, said inboard sidewall and said outboard sidewall being formed with transversely aligned openings, said axle being disposed through said openings and being substantially surrounded by said beam, a brake system component is positioned above at least a portion of the beam adjacent the recessed area, said recessed area protecting said brake system component from road debris and contaminants; and
- an axle wrap disposed around said axle, said wrap being disposed through said transversely aligned openings and rigidly attaching the axle to said beam, the axle wrap being located at least 1 inch from said beam top wall.

17. A suspension assembly for a heavy-duty vehicle integrated axle/suspension system, said suspension assembly comprising:
- a beam, said beam being pivotally connected to a frame of said heavy duty vehicle adjacent a first end of the beam, an axle of said heavy-duty vehicle being rigidly attached to the beam;
- a force reacting suspension component mounted adjacent a second end of the beam, said force reacting suspension component also being connected to said frame;
- a recessed area formed on a surface of said beam, enabling a brake system component is positioned above at least a portion of the beam adjacent the recessed area, said recessed area protecting said brake system component from road debris and contaminants, said suspension assembly including a lever arm ratio of at least about 1.34.

* * * * *

UNITED STATES PATENT AND TRADEMARK OFFICE
CERTIFICATE OF CORRECTION

PATENT NO.       : 10,780,874 B2
APPLICATION NO.  : 16/101661
DATED            : September 22, 2020
INVENTOR(S)      : Donald R. Hester and Benedetto A. Naples Page 1 of 1

It is certified that error appears in the above-identified patent and that said Letters Patent is hereby corrected as shown below:

In the Claims

Claim 13, Column 16, Line 66, after the term "arm" delete "ration" and insert --ratio--.

Claim 15, Column 17, Line 27, before the term "brake" insert --a--.

Claim 17, Column 18, Line 33, before the word "a" delete "enabling".

Signed and Sealed this
Seventeenth Day of November, 2020

Andrei Iancu
*Director of the United States Patent and Trademark Office*